United States Patent [19] Patent No.: US 11,943,733 B2
Suh                                (45) Date of Patent:   Mar. 26, 2024

(54) ACCESS MANAGEMENT METHOD AND DEVICE FOR PERFORMING DATA COMMUNICATION SERVICE BY USING NAS PROTOCOL IN 5G ENVIRONMENT

(71) Applicant: Samsung Electronics Co., Ltd., Suwon-si (KR)

(72) Inventor: Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/755,512

(22) PCT Filed: Oct. 30, 2020

(86) PCT No.: PCT/KR2020/015069
§ 371 (c)(1),
(2) Date: Apr. 29, 2022

(87) PCT Pub. No.: WO2021/086126
PCT Pub. Date: May 6, 2021

(65) Prior Publication Data
US 2022/0377695 A1   Nov. 24, 2022

(30) Foreign Application Priority Data

Oct. 30, 2019 (KR) .................. 10-2019-0136980
Nov. 1, 2019 (KR) .................. 10-2019-0138991
Nov. 15, 2019 (KR) .................. 10-2019-0147157

(51) Int. Cl.
*H04W 76/25* (2018.01)
*H04L 65/1016* (2022.01)
(Continued)

(52) U.S. Cl.
CPC ......... *H04W 60/04* (2013.01); *H04L 65/1016* (2013.01); *H04W 60/02* (2013.01); *H04W 76/25* (2018.02)

(58) Field of Classification Search
CPC ..... H04W 60/04; H04W 60/02; H04W 76/25; H04W 48/12; H04W 88/02; H04W 48/02;
(Continued)

(56) References Cited

U.S. PATENT DOCUMENTS 9,438,883 B2   9/2016 Oyman
2019/0082376 A1*  3/2019 Hong ................ H04W 76/10
(Continued)

FOREIGN PATENT DOCUMENTS

WO   2018174516 A1   9/2018
WO   2019030429 A1   2/2019

OTHER PUBLICATIONS

3GPP ("3rd Generation Partnership Project; Technical Specification Group Core Network and Terminals; Non-Access-Stratum (NAS) protocol for 5G System (5GS); Stage 3 (Release 16)", 3GPP Standard; Technical Specification; 3GPP TS 24.501V16.2.0, Sep. 24, 2019 (Sep. 24, 2019), pp. 1-611).*
(Continued)

*Primary Examiner* — Lakeram Jangbahadur

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to one embodiment of the disclosure, (Continued)

terminal access is controlled or terminal access is permitted by using NAS protocol in a 5G communication, and thus a congested situation can be controlled.

13 Claims, 5 Drawing Sheets

(51) Int. Cl.
  *H04W 60/02* (2009.01)
  *H04W 60/04* (2009.01)
(58) Field of Classification Search
  CPC .............. H04W 60/00; H04L 65/1016; H04L 65/1046; H04L 65/1063; H04L 65/1069; H04L 65/1073
  See application file for complete search history.

(56) References Cited

U.S. PATENT DOCUMENTS

| | | |
|---|---|---|
| 2020/0015311 A1 | 1/2020 | Kim |
| 2020/0178158 A1 | 6/2020 | Won et al. |

OTHER PUBLICATIONS

NTT (Unified Access Control for IMS registration related signaling, Oct. 7-11, 2019).*

3GPP ("3rd Generation Partnership Project; Technical Specification Group Core Network and Terminals; Non-Access-Stratum (NAS) protocol for 5G System (5GS); Stage 3 (Release 16)", 3GPP Standard; Technical.*

International Search Report and Written Opinion of the International Searching Authority dated Jan. 26, 2021, in connection with International Application No. PCT/KR2020/015069, 9 pages.

3GPP TS 24.501 V16.2.0 (Sep. 2019), 3rd Generation Partnership Project; Technical Specification Group Core Network and Terminals; Non-Access-Stratum (NAS) protocol for 5G System (5GS); Stage 3; (Release 16); Sep. 2019, 610 pages.

Ericsson, et al., "UAC: Correction for operator-defined access categories," C1-188041, 3GPP TSG-CT WG1 Meeting #113, West Palm Beach (FL), USA, Nov. 26-30, 2018, 26 pages.

NTT DOCOMO, et al., "Unified Access Control for IMS registration related signalling," C1-196509, 3GPP TSG-CT WG1 Meeting #120, Portoroz (Slovenia), Oct. 7-11, 2019, 25 pages.

Supplementary European Search Report dated Oct. 26, 2022, in connection with European Application No. 20881562.1, 15 pages.

Intel, "On the requirements discussion for access barring of IMS registration-related signalling between CT1 and SA1," C1-196363, 3GPP TSG CT WG1 Meeting #120, Portoroz (Slovenia), Oct. 7-11, 2019, 9 pages.

NTT DOCOMOo, et al., "Unified Access Control IMS registration related signalling," C1-196509, 3GPP TSG-CT WG1 Meeting #120, Portoroz (Slovenia), Oct. 7-11, 2019, 21 pages.

* cited by examiner

ACCESS MANAGEMENT METHOD AND DEVICE FOR PERFORMING DATA COMMUNICATION SERVICE BY USING NAS PROTOCOL IN 5G ENVIRONMENT

CROSS-REFERENCE TO RELATED APPLICATIONS

This application is a 371 National Stage of International Application No. PCT/KR2020/015069, filed Oct. 30, 2020, which claims priority to Korean Patent Application No. 10-2019-0136980, filed Oct. 30, 2019, Korean Patent Application No. 10-2019-0138991, filed Nov. 1, 2019, and Korean Patent Application No. 10-2019-0147157, filed Nov. 15, 2019, the disclosures of which are herein incorporated by reference in their entirety.

BACKGROUND

1. Field

The disclosure relates to a scheme for managing access by using a NAS protocol for data communication in a next-generation 5G communication environment, a scheme for controlling access, or a device configured perform such a function.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, there is a need for a scheme for managing access by using a NAS protocol for data communication in a next-generation 5G communication environment.

SUMMARY

In line with introduction of 5G mobile communication, an access and mobility management function (AMF) which is a management entity for managing the mobility of a UE and a session management function (SMF) which is an entity for managing a session have been separated. Such separation between the mobility management entity and the session management entity, unlike the conventional operation scheme in which the MME manages both in 4G LTE communication, has changed the scheme for communication between a UE and a network entity and the scheme for managing communication.

In line with introduction of 5G mobile communication, mobility management is performed through an AMF via a N3IWF with regard to non 3GPP access, and performs session management through an SMF. In addition, the AMF performs mobility management, and may management security related information which is an important element in connection with mobility management.

Meanwhile, in 4G, an MME is in charge of mobility management and session management and is in charge of management regarding the same. Therefore, not only in the case of a 5G communication scheme in which the AMF and the SMF are separated as described above, 5G may be performed also in the case of an architecture shape of non stand alone architecture, when entities for 4G and 5G communication exist, by using some 4G communication entities in connection with performing 5G communication.

In order to solve the above-mentioned problems, a method of a terminal in a wireless communication system according to the disclosure may include, by an application layer, generating a mobile originating (MO) Internet protocol (IP) multimedia subsystem (IMS) registration-related IMS signal generated in the terminal, by a non-access stratum (NAS) layer, mapping access category information to an access attempt type of the MO-IMS-registration-related IMS signal, transmitting the access category information mapped to the access attempt type from the NAS layer to an AS layer, and by the AS layer, determining to allow access for the access attempt type in case that the access category information mapped to the access attempt type is 9.

Meanwhile, a terminal in a wireless communication system may include a transceiver and a controller configured to control to cause an application layer to generate a mobile originating (MO) Internet protocol (IP) multimedia subsystem (IMS) registration-related IMS signal generated in the terminal, control to cause a non-access stratum (NAS) layer to map access category information to an access attempt type of the MO-IMS-registration-related IMS signal, control to transmit the access category information mapped to the access attempt type from the NAS layer to an AS layer, and control to cause the AS layer to determine to allow access for the access attempt type in case that the access category information mapped to the access attempt type is 9.

According to the disclosure, in connection with 5G communication, a NAS protocol may be used to control access of a terminal or allow access of the terminal, thereby controlling congested situations. Accordingly, an efficient communication service may be provided, and data communication may be performed efficiently.

DETAILED DESCRIPTION

Figure 1:
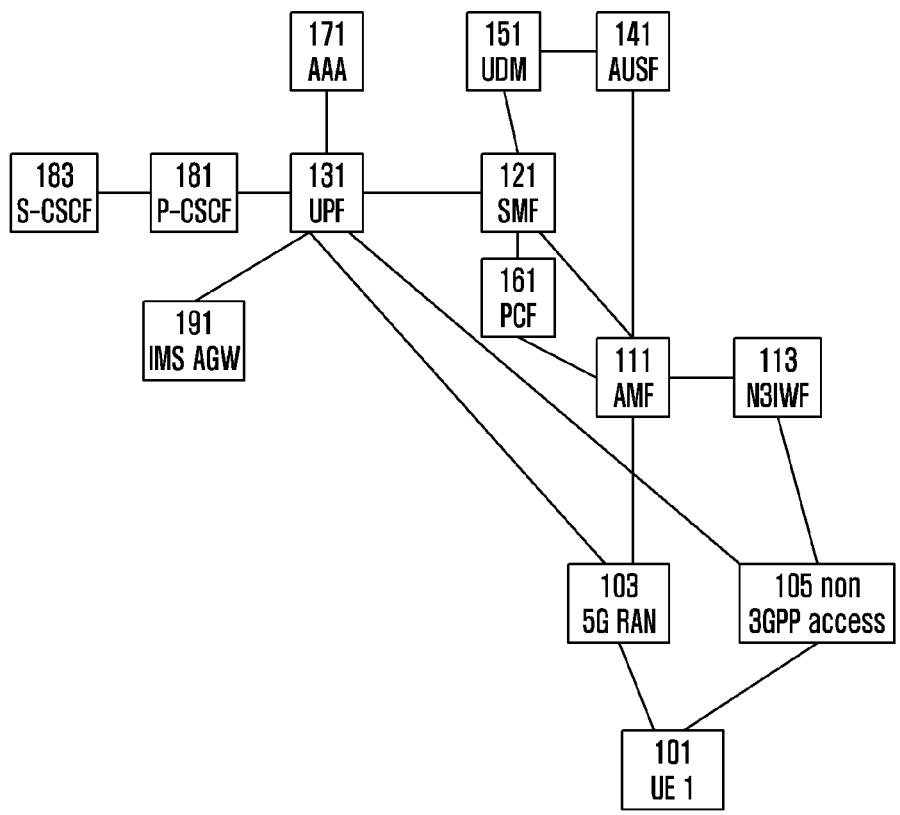
FIG. 1 illustrates examples of a communication procedure for performing communication having improved communication performance by allowing and controlling access of a terminal by using a NAS protocol in a 5G network, a terminal for a method, and a network environment, according to an embodiment of the disclosure.

Hereinafter, embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, terms and names defined in the standards for 5G and LTE systems will be used for the convenience of description. However, the disclosure is not limited by these terms and names, and may be applied in the same way to systems that conform other standards.

That is, the following detailed description of embodiments of the disclosure will be mainly directed to the communication standards defined by 3GPP. However, based on determinations by those skilled in the art, the main idea of the disclosure may also be applied to other communication systems having similar technical backgrounds through some modifications without significantly departing from the scope of the disclosure.

The disclosure proposes a method for managing access by using a NAS protocol in order for data communication in a next-generation 5G communication environment, a method for controlling access, or a device for performing such a function.

Particularly, the disclosure enables communication to be performed without restricting (barring) access for communication in the case of performing communication such as an MMTEL voice, MMTEL video, and SMS over IMS by using a IP multimedia subsystem (IMS). Access control is to enable smooth communication under a congestion situation. Such a technology proposes a method for controlling or allowing access of a terminal, and providing a service by using a NAS protocol in an environment in which multiple terminals perform access, for example, an emergency or disaster situation, an environment in which multiple terminals perform access in disaster situations such as earthquake and tidal waves, or a situation where an event-based service occurs due to a cluster of multiple terminals, for example, a situation where it is necessary to control access of a terminal in an environment in which event-based service traffic or a multimedia streaming service occurs in a music event or in a situation where there are crowds in a large stadium.

FIG. 1 illustrates examples of a communication procedure for performing communication having improved communication performance by allowing or controlling access of a terminal by using a NAS protocol in a 5G network, a terminal for a method, and a network environment, according to an embodiment of the disclosure.

In an embodiment of the disclosure, assuming a 5G network, entities (or devices), such as user plane function (UPF), session management function (SMF), access and mobility management function (AMF), 5G radio access network (RAN), user data management (UDM), and policy control function (PCF), may configure a network system. For authentication of the entities, an authentication server function (AUSF), and authentication, authorization, and accounting (AAA) may also exist in the system.

An N3 interworking function (N3IWF) may be required for the case in which a UE performs communication via non 3GPP access. In addition, in case that the UE performs communication via non 3GPP access, session management may be controlled via a UE, non 3GPP access, N3IWF, and SMF, and mobility management may be controlled via a UE, non 3GPP access, N3IWF, and AMF.

In 5G, mobility management and session management entities may be separated into the AMF and SMF. A stand-alone deployment structure which performs communication only with 5G communication entities in order for 5G communication, and a non-stand-alone deployment structure which uses 4G and 5G entities in order for 5G communication have been also considered.

There may be P-CSCF and S-CSCF in order to control IMS message signaling for an MMTEL voice, MMTEL video, and SMS over IMS service via an IP multimedia subsystem (IMS). In addition, an IMS AGW (gateway) exists for an IMS service, so that multimedia communication can be performed.

The communication network on which the disclosure is based is assumed to be a 5G or 4G LTE network, but the same concept may also be applicable to other systems within a category which can be understood by those skilled in the art.

(Method 1)

Figure 2:
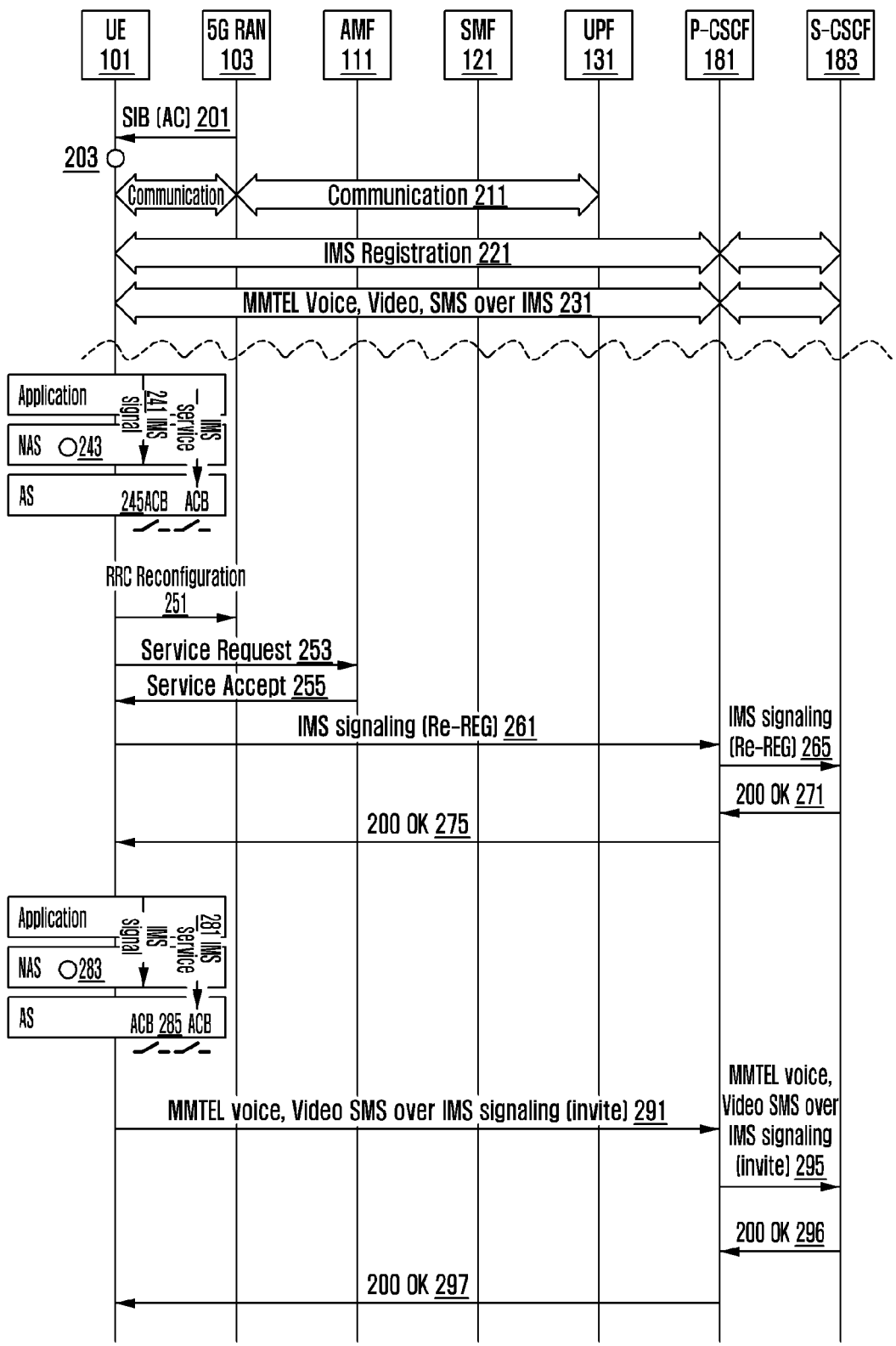
FIG. 2 illustrates an embodiment of a procedure and a method for performing communication by allowing and controlling access of a terminal by using a NAS protocol in a 5G network environment, according to an embodiment of the disclosure.

FIG. 2 illustrates an embodiment of a procedure and a method for performing communication by allowing and controlling access of a terminal by using a NAS protocol in a 5G network environment, according to an embodiment of the disclosure.

In operation 201, a UE may receive information on an access category from a 5G RAN gNB. For example, the UE may receive access category information via broadcasted information, from the gNB, by using SIB1. The SIB1 is only an embodiment, and the UE may receive the information via any SIB.

In operation 203, the UE may store the received access category. In relation to the received access category-related information, barring-related information may be explicitly transmitted as information such as an access category-related barring factor and an access category, or may be implicitly transmitted as information including a predefined barring factor and an identifier of barring-related information.

In operation 211, the UE may perform communication with a UPF via a 5G RAN.

In operation 221, the UE may perform, via P-CSCF and S-CSCF, an IMS registration process, for example, a registration process for using an MMTEL voice, video, or SMS over IMS. Such a process is a session registration and session setup process for using an MMTEL voice, video, or SMS over IMS.

In operation 231, the UE may negotiate a session for a service such as an MMTEL voice, video, or SMS over IMS. Via such a session negotiation process, a resource reservation for a service such as an MMTEL voice, video, or SMS over IMS may be made. In addition, the UE may use a relevant service, for example, an MMTEL voice, video, or SMS over IMS. After operation 231, for some reason, a situation in which a session for the IMS of the UE is disconnected and an RRC is also released may occur.

Subsequent operations 241 and 243 to 245 are processes occurring inside the UE.

Referring to operation 241, an IMS signal may be transmitted to a NAS layer from an application layer of the UE, for example, an upper layer in charge of an IMS-related service. Such an IMS signal may be, for example, a signal related to mobile originating IMS registration, subscription, and notification. Particularly, for the IMS-related service, the application layer may trigger initiation of an operation in order to transmit an IMS session register message, a reregister or register message, or a signal (subscribe) message for subscription. Alternatively, in case that a notify message for transmission of information to the UE from an IMS-related network node is received, the initiation of the operation may be triggered to receive the notify message to the NAS layer from the upper layer of the UE, for example, the application layer. In operation 243, the NAS layer of the UE may map an access attempt type and an access category descended from the upper layer (e.g., the application layer), so as to transmit the same to an AS layer.

Alternatively, the NAS layer of the UE may map an access attempt type and an access category according to a signaling indication descended from the upper layer (e.g., the application layer), so as to transmit, to the AS layer, an access category corresponding to the signaling indication descended from the application layer. For example, the upper layer transmits, to the NAS layer, a signal indicating that an MO-IMS-registration-related signal has started, and the NAS layer maps an access attempt type and an access category related to the MO-IMS-registration-related signal. According to an embodiment, the NAS layer may transmit an access category corresponding to the MO-IMS-registration-related signal to the AS layer. In this case, one access category selected by mapping may be transmitted to the AS layer. According to another embodiment, in this case, an access category selected by mapping may be transmitted to multiple AS layers.

In this case, the access attempt type may be an access attempt type corresponding to a mobile originating (MO) IMS-related signal such as an IMS register, IMS reregister, IMS subscribe, or IMS notify message. In addition, an access category mapped with the access attempt type may be 9 which is a new access category. Although 9 is taken as an example in the disclosure, 9 to 31 are currently reserved in order for use as a new standard access category, and thus a value from 9 to 31 may be used. Therefore, another value from 9 to 31 may be used as an access category.

Thereafter, in operation 245, in case that access category information stored in the UE is, for example, at least one of 3 or 7, the AS layer of the UE may determine whether to block access of the UE to a corresponding cell, based on access attempt type information, information of access category 9, and mapping information which are received from an NAS.

Alternatively, as an embodiment, based on information which allows barring or access, and an access category-related barring factor stored in the UE, the AS layer of the UE may determine whether to block access of the UE to a corresponding cell, based on the access category information received from the NAS.

Specifically, the AS layer may determine whether to block access by using a barring factor included in access class barring (ACB) information which is received. For example, in case that the received ACB value is 7, since a value received from the NAS indicates that an access category in which an access attempt type is mapped to an IMS registration-related value is 9, the AS layer may allow access of the UE to a corresponding cell without blocking an access attempt from the NAS layer.

Alternatively, in case that the received ACB values are 3 and 7, since a value received from the NAS indicates that an access category in which an access attempt type is mapped to an IMS registration-related value is 9, the AS layer may allow access of the UE to a corresponding cell without blocking an access attempt from the NAS layer.

Therefore, in operation 251, the UE may transmit an RRC reconfiguration request (RRC reconfiguration request or RRC configuration request) message to the gNB (e.g., 5G NR).

As in operation 253, the NAS layer of the UE may deliver a service request message to the AMF.

Thereafter, as in operation 255, in response to the service request message, a service accept message may be transmitted from the AMF to the UE.

According to another embodiment, in response to the service request message, a service reject message may be transmitted from the AMF to the UE.

Thereafter, in operations 261 and 265, a message such as reregistration, registration, or subscribe, which is IMS signaling, may be transmitted from the UE to the S-CSCF via the P-CSCF.

Thereafter, as in operations 271 and 275, a 200 OK message, which is a response to notify that reregistration, registration, or subscribe has succeeded, may be transmitted from the S-CSCF to the UE via the P-CSCF.

Subsequent operations 281, 283, and 285 are processes occurring inside the UE.

Thereafter, as in operation 281, an IMS session negotiation-related signal for using a service such as an MMTEL voice, MMTEL video, or SMS over IMS inside the UE, that is, an IMS signal for reservation of a resource for an MMTEL voice, MMTEL video, or SMS over IMS service, for example, a signal such as INVITE or PRACK, may be triggered from the upper layer (e.g., the application layer) to the NAS layer.

In operation 283, according to an example, in the NAS layer of the UE, in case that an access attempt type corresponds to an MMTEL voice, 4 may be mapped to an access category, in case that the access attempt type corresponds to an MMTEL video, 5 may be mapped to the access category, and in case that the access attempt type corresponds to an SMS over IMS, 6 may be mapped to the access category.

Thereafter, in operation 285, in case that access category information stored in the UE is, for example, 3, 7, or the like, in the case of the MMTEL voice received from the NAS, the AS layer of the UE may determine whether to block access by using a barring factor included in the received access class barring (ACB) information, based on access attempt type information and information of access category 4. For example, in case that the received ACB value is 3 or 7, since a value received from the NAS indicates access category 4 in which an access attempt type is mapped to an MMTEL voice value, the AS layer may allow access of the UE to a corresponding cell without blocking an access attempt from the NAS layer.

For example, in case that the received ACB value is 4, since a value received from the NAS indicates access category 4 in which an access attempt type is mapped to an MMTEL voice value, the AS layer may block an access attempt from the NAS layer and may not allow access of the UE to a corresponding cell.

Thereafter, as in operations 291 and 295, a message such as INVITE or PRACK for an IMS MMTEL video, MMTEL voice, or IMS over SMS may be transmitted from the UE to the S-CSCF via the P-CSCF.

Thereafter, as in operations 296 and 297, a 200 OK message, which is a response to notify that the INVITE, PRACK, or the like for the IMS MMTEL video, MMTEL voice, or IMS over SMS, has succeeded, may be transmitted from the S-CSCF to the UE via the P-CSCF.

Referring to FIG. 2, the following operations may be performed.

Among UE operations in a 5GMM-REGISTERED state,
an operation of the UE in an ATTEMPTING-REGISTRATION-UPDATE state, 1) in case that T3346 is not running when the UE is in 3GPP access, the UE may initiate a mobility and periodic registration update registration procedure upon request for MO-IMS-registration-related signaling from the upper layer (e.g., the application layer).

2) in case that T3346 is not running when the UE is in 3GPP non access (e.g., Wi-Fi, etc.), upon request for MO-IMS-registration-related signaling from the upper layer (e.g., the application layer), the UE may initiate a mobility and periodic registration update registration procedure.

The above contents are summarized as shown in Table 1-1 below.

TABLE 1-1

5.2.3.2 Detailed description of UE behaviour in state 5GMM-REGISTERED
5.2.3.2.3 ATTEMPTING-REGISTRATION-UPDATE
The UE in 3GPP access:
X) may initiate a registration procedure for mobility and periodic registration update upon request for an MO-IMS-registration-related-signaling (eg, Register, Subscribe, re-Register, registration, reregistration, subscription refresh) from the upper layers, if timer T3346 is not running;
The UE in non-3GPP access
may initiate a registration procedure for mobility and periodic registration update upon request for an MO-IMS-registration-related-signaling (eg. Register, Subscribe, re-Register, registration, reregistration, subscription refresh) from the upper layers, if timer T3346 is not running;

Among UE operations in a 5GMM-REGISTERED state, an operation of the UE in an ATTEMPTING-REGISTRATION-UPDATE state, 1) in case that timer T3346 is not running when the UE is in 3GPP access, the UE may initiate a registration procedure for mobility and periodic registration update upon request for MO-IMS-registration-related signaling from the upper layer (e.g., the application layer).

2) in case that T3346 is not running when the UE is in non 3GPP access (e.g., Wi-Fi, etc.), the UE may initiate a registration procedure for mobility and periodic registration update upon request for MO-IMS-registration-related signaling from the upper layer (e.g., the application layer).

The above contents are summarized as shown in Table 1-2 below.

TABLE 1-2

5.2.3.2 Detailed description of UE behaviour in state 5GMM-REGISTERED
5.2.3.2.3 ATTEMPTING-REGISTRATION-UPDATE
The UE in 3GPP access:
may initiate a registration procedure for mobility and periodic registration update upon request for an MO IMS registration related signaling (eg. Register, Subscribe, re-Register, registration, reregistration, subscription refresh) from the upper layers, if timer T3346 is not running;
The UE in non-3GPP access:
may initiate a registration procedure for mobility and periodic registration update upon request for an MO IMS registration related signaling (eg. Register, Subscribe, re-Register, reqistration, reregistration, subscription refresh) from the upper layers, if timer T3346 is not running;

In case that the UE receives a REGISTRATION REJECT message, the UE takes the following operation according to a 5GMM cause value. For example, in case that the UE receives the REGISTRATION REJECT message from an AMF, the UE may perform the following operations according to a 5GMM cause value included in the message.

For 5GMM cause #22 (congestion)

In case that a mobility and periodic registration update registration procedure has been initiated in the following situation,
  1) in the case of MO-IMS-registration-related signaling (e.g., a register, subscribe, re-register, registration, reregistration, and subscription refresh message or signaling) (in addition, access category 9 for the signaling, or an operator defined access category (32 as an embodiment)),
  2) or in the case of ongoing MO-IMS-registration-related signaling (e.g., a register, sub scribe, re-register, registration, reregistration, and subscription refresh message or signaling) (in addition, for the signaling, in case that the procedure has been initiated for a reason such as NAS signaling connection recovery during access category 9 or an operator defined access category (32 as an embodiment)),
  the UE provides a notification that a request has been accepted to the upper layer (e.g., the application layer) despite network congestion.

The above contents are summarized as shown in Table 2-1 below.

TABLE 2-1

5.5.1.3.5 Mobility and periodic registration update not accepted by the network
If the mobility and periodic registration update request cannot be accepted by the network, the AMF shall send a REGISTRATION REJECT message to the UE including an appropriate 5GMM cause value.
The UE shall take the following actions depending on the 5GMM cause value received in the REGISTRATION REJECT message.
5GMM cause #22 (Congestion).
If the registration procedure for mobility and periodic registration update was initiated for an MO-IMS-registration-related-signaling (eg. Register, Subscribe; re-Register, registration, reregistration subscription refresh) (ie. access category 9, or operator defined access category (eg.32)) or for NAS signalling connecton recovery during an ongoing an MO-IMS-registration-related-signaling (eg. Register, Subscribe, re-Register, registration, reregistration, subscription refresh) (i.e, access category 9, or operator defined access category (eg.32)) , then a notification that the request was accepted ( despite network congestion) shall be provided to upper layers.

In case that the mobility and periodic registration update request cannot be accepted by the network, the AMF transmits a REGISTRATION REJECT message including an appropriate 5GMM cause value to the UE.

The UE may take the following operations according to the 5GMM cause value received while being included in the REGISTRATION REJECT message.

Case 1 as an embodiment) for 5GMM cause #22 (congestion),

In case that a registration procedure for mobility and periodic registration update has been initiated in the following situation,
  1) for example, an MO MMTEL voice call (e.g., access category 4),
  2) or MO-IMS-registration-related signaling (e.g., a register, subscribe, re-register, registration, reregistration, and subscription refresh message or signaling) (in addition, access category 9 for the signaling, or an operator defined access category (32 as an embodiment)),
  3) or for NAS signaling connection recovery during an ongoing MMTEL voice call (e.g., access category 4),
  4) or in the case of ongoing MO-IMS-registration-related signaling (e.g., a register, subscribe, re-register, registration, reregistration, and subscription refresh message or signaling) (in addition, for the signaling, in case that the procedure has been initiated for a reason such as NAS signaling connection recovery during access category 9 or an operator defined access category (32 as an embodiment)),
  the UE (in the UE, inside the UE) (in case that the UE receives a REGISTRATION REJECT message including a 5GMM cause value which is 22) provides a notification that a request has not been accepted due to network congestion (from the NAS layer) to the upper layer (e.g., the application layer).

Case 2 as an embodiment) for 5GMM cause #22 (congestion)

In case that a registration procedure for mobility and periodic registration update has been initiated in the following situation,
  1) for example, an MO MMTEL voice call (e.g., access category 4),
  2) or MO-IMS-registration-related signaling (e.g., a register, subscribe, re-register, registration, reregistration, and subscription refresh message or signaling) (in addition, access category 9 for the signaling, or an operator defined access category (32 as an embodiment)),
  3) or for NAS signaling connection recovery during an ongoing MMTEL voice call (e.g., access category 4),
  4) or in the case of an ongoing procedure for MO-IMS-registration-related signaling
  (e.g., a register, subscribe, re-register, registration, reregistration, and subscription refresh message or signaling) (in addition, for the signaling, in case that the procedure has been initiated for a reason such as NAS signaling connection recovery during access category 9 or an operator defined access category (32 as an embodiment)),
  the UE (in the UE, inside the UE) (in case that the UE receives a REGISTRATION REJECT message including a 5GMM cause value which is 22) provides a notification that a request has not been accepted due to network congestion (from the NAS layer) to the upper layer (e.g., the application layer).

Case 3 as an embodiment) for 5GMM cause #22 (congestion),

In case that a registration procedure for mobility and periodic registration update has been initiated in the following situation,
1) for example, in the case of MO-IMS-registration-related signaling (e.g., a register, sub scribe, re-register, registration, reregistration, and subscription refresh message or signaling) (in addition, access category 9 for the signaling, or an operator defined access category (32 as an embodiment)),
2) or in the case of ongoing MO-IMS-registration-related signaling (e.g., a register, sub scribe, re-register, registration, reregistration, and subscription refresh message or signaling) (in addition, for the signaling, in case that the procedure has been initiated for a reason such as NAS signaling connection recovery during access category 9 or an operator defined access category (32 as an embodiment)),
the UE (in the UE, inside the UE) (in case that the UE receives a REGISTRATION REJECT message including a 5GMM cause value which is 22) provides a notification that a request has not been accepted due to network congestion (from the NAS layer) to the upper layer (e.g., the application layer).

Case 4) as an embodiment) for 5GMM cause #22 (congestion),

In case that a registration procedure for mobility and periodic registration update has been initiated in the following situation,
1) for example, in the case of MO-IMS-registration-related signaling (e.g., a register, subscribe, re-register, registration, reregistration, and subscription refresh message or signaling) (in addition, access category 9 for the signaling, or an operator defined access category (32 as an embodiment)),
2) or in the case of an ongoing procedure for MO-IMS-registration-related signaling (e.g., a register, subscribe, re-register, registration, reregistration, and subscription refresh message or signaling) (in addition, for the signaling, in case that the procedure has been initiated for a reason such as NAS signaling connection recovery during access category 9 or an operator defined access category (32 as an embodiment)),
the UE (in the UE, inside the UE) (in case that the UE receives a REGISTRATION REJECT message including a 5GMM cause value which is 22) provides a notification that a request has not been accepted due to network congestion (from the NAS layer) to the upper layer (e.g., the application layer).

The above contents are summarized as shown in Table 2-2 below.

TABLE 2-2

5.5.1.3.5Mobility and periodic registration update not accepted by the network
If the mobility and periodic registration update request cannot be accepted by the network, the AMF shall send a REGISTRATION REJECT message to the UE including an appropriate 5GMM cause value.
The UE shall take the following actions depending on the 5GMM cause value received in the REGISTRATION REJECT message.
5GMM cause #22 (Congestion).
Case 1)
If the registration procedure for mobility and periodic registration update was initiated for an MO MMTEL voice call (i.e. access category 4), for an MO IMS registration related signalling (i.e. access category 9), or for NAS signalling connection recovery during an ongoing MO TABLE 2-2-continued MMTEL voice call (i.e. access category 4) or during an ongoing MO IMS registration related signalling(i.e. access category 9), then a notification that the request was not accepted due to network congestion shall be provided to upper layers.
Case 2)
If the registration procedure for mobility and periodic registration update was initated for an MO MMTEL voice call (i.e. access category 4), for an MO IMS registration related signalling (i.e. access category 9), or for NAS signalling connection recovery during an ongoing MO MMTEL voice call (i.e. access category 4) or during an ongoing procedure for MO IMS registration related signalling(i.e. access category 9), then a notification that the request was not accepted due to network congestion shall be provided to upper layers.
Case 3)
If the registration procedure for mobility and periodic registration update was initiated for an MO IMS registration related signalling (eg. Register, Subscribe, re-Register, registration, reregistration subscription refresh) (i.e. access category 9) or for NAS signalling connection recovery during an ongoing MO IMS registration related signalling (eg. Register, Subscribe, re-Register, registration, Registration, subscription refresh) (i.e. access category 9), then a notificaton that the request was not acccepted due to network congestion shall be provided to upper layers.
Case 4)
If the registration procedure for mobility and periodic registration update was initiated for an MO IMS registration related signalling (eg. Register, Subscribe, re-Register, registration, reregistration, subscription refresh) (i.e. access category 9) or for NAS signalling connection recovery during an ongoing procedure for MO IMS registration related signalling (eg. Register, Subscribe, re-Register, registration, reregistration, subscription refresh) (i.e. access category), then a noftification that the request was not accepted due to network congestion shall be provided to upper layers.

The following abnormal process is defined.

In case that T3346 is running, and in case that a mobility and periodic registration update registration procedure has been initiated in the following situation,
1) in the case of MO-IMS-registration-related signaling (e.g., a register, subscribe, re-register, registration, reregistration, and subscription refresh message or signaling) (in addition, access category 9 for the signaling, or an operator defined access category (32 as an embodiment)),
2) or in the case of ongoing MO-IMS-registration-related signaling (e.g., a register, subscribe, re-register, registration, reregistration, and subscription refresh message or signaling) (in addition, for the signaling, in case that the procedure has been initiated for a reason such as NAS signaling connection recovery during access category 9 or an operator defined access category (32 as an embodiment)),
the UE provides a notification that a request has been accepted to the upper layer (e.g., the application layer) despite network congestion.

The above contents are summarized as shown in Table 3-1 below.

TABLE 3-1

5.5.1.3.7Abnormal cases in the UE
The following abnormal cases can be identified:
a) Timer T3346 is running.
If the registration procedure for mobility and periodic registration update was initiated for an MO-IMS-registration-related-signaling (eg. Register, Subscribe, re-Register, registration, reregistration, subscription refresh) (i.e. access category 9, or operator defined access category (eg.32)) or for NAS signalling connection recovery during an ongoing an MO-IMS-registration-related-signaling (eg. Register, Subscribe, re-Register, registration, reregistration, subscription refresh) (i.e. access category 9, or operator defined access category (eg.32)), then a notification that the procedure was initiated despite network congestion shall be provided to upper layers.

In relation to a registration procedure for mobility and periodic registration update, The following abnormal process in the UE is defined.

Case 1)

In case that timer T3346 is running in the UE, and in case that the registration procedure for mobility and periodic registration update has been initiated in the following situation, 1) in case that the registration procedure has been initiated for an MO MMTEL voice call (e.g., access category 4), 2) or in case that the registration procedure has been initiated for MO-IMS-registration-related signaling (e.g., a register, sub scribe, re-register, registration, reregistration, and subscription refresh message or signaling) (in addition, access category 9 for the signaling, or an operator defined access category (32 as an embodiment)), 3) or in case that the registration procedure has been initiated for NAS signaling connection recovery during an ongoing MO MMTEL voice call (e.g., access category 4), 4) or in case that the registration procedure has been initiated for a reason such as NAS signaling connection recovery during (ongoing) MO-IMS-registration-related signaling (e.g., a register, subscribe, re-register, registration, reregistration, and subscription refresh message or signaling) (in addition, access category 9 for the signaling, or an operator defined access category (32 as an embodiment)), the UE (in the UE, inside the UE) provides a notification that the procedure has not been initiated due to network congestion (from the NAS layer) to the upper layer (e.g., the application layer).

Case 2)

In case that timer T3346 is running in the UE, and in case that the registration procedure for mobility and periodic registration update has been initiated in the following situation, 1) in case that the registration procedure has been initiated for an MO MMTEL voice call (e.g., access category 4), 2) or in case that the registration procedure has been initiated for MO-IMS-registration-related signaling (e.g., a register, sub scribe, re-register, registration, reregistration, and subscription refresh message or signaling) (in addition, access category 9 for the signaling, or an operator defined access category (32 as an embodiment)), 3) or in case that the registration procedure has been initiated for NAS signaling connection recovery during an ongoing MO MMTEL voice call (e.g., access category 4), 4) or in case that the registration procedure has been initiated for a reason such as NAS signaling connection recovery during a (ongoing) procedure of MO-IMS-registration-related signaling (e.g., a register, subscribe, re-register, registration, reregistration, and subscription refresh message or signaling) (in addition, access category 9 for the signaling, or an operator defined access category (32 as an embodiment)), the UE (in the UE, inside the UE) provides a notification that the procedure has not been initiated due to network congestion (from the NAS layer) to the upper layer (e.g., the application layer).

Case 3)

In case that timer T3346 is running in the UE, and in case that the registration procedure for mobility and periodic registration update has been initiated in the following situation, 1) that is, in case that the registration procedure has been initiated for MO-IMS-registration-related signaling (e.g., a register, subscribe, re-register, registration, reregistration, and subscription refresh message or signaling) (in addition, access category 9 for the signaling, or an operator defined access category (32 as an embodiment)), 2) or in case that the registration procedure has been initiated for a reason such as NAS signaling connection recovery during (ongoing) MO-IMS-registration-related signaling (e.g., a register, subscribe, re-register, registration, reregistration, and subscription refresh message or signaling) (in addition, access category 9 for the signaling, or an operator defined access category (32 as an embodiment)), the UE (in the UE, inside the UE) provides a notification that the procedure has not been initiated due to network congestion (from the NAS layer) to the upper layer (e.g., the application layer).

Case 4)

In case that timer T3346 is running in the UE, and in case that the registration procedure for mobility and periodic registration update has been initiated in the following situation, 1) that is, in case that the registration procedure has been initiated for MO-IMS-registration-related signaling (e.g., a register, subscribe, re-register, registration, reregistration, and subscription refresh message or signaling) (in addition, access category 9 for the signaling, or an operator defined access category (32 as an embodiment)), 2) or in case that the registration procedure has been initiated for a reason such as NAS signaling connection recovery during a (ongoing) procedure of MO-IMS-registration-related signaling (e.g., a register, subscribe, re-register, registration, reregistration, and subscription refresh message or signaling) (in addition, access category 9 for the signaling, or an operator defined access category (32 as an embodiment)), the UE (in the UE, inside the UE) provides a notification that the procedure has not been initiated due to network congestion (from the NAS layer) to the upper layer (e.g., the application layer).

The above contents are summarized as shown in Table 3-2 below.

TABLE 3-2

5.5.1.3 Registration procedure for mobility and periodic registration update
5.5.1.3.7Abnormal cases in the UE
The following abnormal cases can be identified:
a) Timer T3346 is running.
Case 1)
If the registration procedure for mobility and perodic registration update was initiated for an MO MMTEL voice call (i.e. access category 4), for an MO IMS registration related signalling (i.e. access category 9), or for NAS signalling connection recovery during an ongoing MO MMTEL voice call (i.e. access category 4) or during an ongoing MO IMS regstration related signalling(i.e access catgory 9), then a notification that the procedure was not initiated due to network congestion shall be provided to upper layers.
Case 2)
If the registration for mobility and peridoic registration update was initiated for an MO MMTEL voice call (i.e. access category 4), for an MO IMS registration related signalling (i.e. access category 9), or for NAS signalling connection recovery during an ongoing MO MMTEL TABLE 3-2-continued voice call (i.e. access category 4) or during an ongoing procedure for MO IMS registration related signalling (i.e. access category 9), then a notification that the procedure was not intiated due to network congestion shall be provided to upper layers.
Case 3)
If the registration procedure for mobility and periodic registration update was initiated for an MO IMS registration related signalling (i.e. access category 9) (eg. Register, Subscribe, re-Register, registration, reregistration, subscription refresh) (or operator defined access category (eg.32) or for NAS signalling connection recovery during an ongoing MO IMS registration related signalling (i.e. access category 9) (eg. Register, Subscribe, re-Register, registration, reregistration, subscription refresh) (or operator defined access category (eg. 32)), then a notification that the procedure was not initiated due to network congestion shall be provided to upper layers.
Case 4)
If the registration procedure for mobility and periodic registration update was initiated for an MO IMS registration related signalling (i.e. access category 9) or for NAS signalling connection recovery during an ongoing procedure for MO IMS registration related signalling (i.e. access category 9), then a notification that the procedure was not initiated due to network congestion shall be provided to upper layers.

As described above, the NAS layer of the UE may deliver a service request message to the AMF. In this case, in response to the service request message for a predetermined reason, a service reject message may be transmitted from the AMF to the UE.

In case that the UE receives the service reject message, the UE takes the following operation according to a 5GMM cause value.

For 5GMM cause #22 (congestion)

In case that a service request procedure has been initiated in the following situation, 1) MO-IMS-registration-related signaling (e.g., a register, subscribe, re-register, registration, reregistration, and subscription refresh message or signaling) (in addition, access category 9 for the signaling, or an operator defined access category (32 as an embodiment)), the UE provides a notification that a request has been accepted to the upper layer (e.g., the application layer) despite network congestion.

The above contents are summarized as shown in Table 4-1 below.

TABLE 4-1

5.6.1.5 Service request procedure not accepted by the network
If the service request cannot be accepted, the network shall return a SERVICE REJECT message to the UE including an appropriate 5GMM cause value.
The UE shall take the following actions depending on the 5GMM cause value received in the SERVICE REJECT message.
5GMM cause #22 (Congestion).
If the service request procedure was initiated for an MO-IMS-registration-related-signaling (eg. Register, Subscribe, re-Register, registration, reregistration, subscription refresh) (i.e. access category 9, or operator defined access category (eg.32)), a notification that the service request was accepted ( despite congestion ) shall be provided to the upper layers.

In case that the network cannot accept a service request, a service reject message including a 5GMM cause value may be transmitted to the UE.

The UE takes the following operation according to a 5GMM cause value (received) and while being (included) in the service reject message.

For 5GMM cause #22 (congestion)

In case that a service request procedure has been initiated in the following situation, Case 1) as an embodiment, In case that the service request procedure has been initiated for an MO MMTEL voice call (access category 4) or MO-IMS-registration-related signaling (e.g., a register, subscribe, re-register, registration, reregistration, and subscription refresh message or signaling) (in addition, access category 9 for the signaling, or an operator defined access category (32 as an embodiment)), in case that the UE receives 5GMM cause 22, the UE (in the UE, inside the UE) provides a notification that a request (or service request) has not been accepted due to (network) congestion (from the NAS layer) to the upper layer (e.g., the application layer).

Case 2) as an embodiment, 1) in case that the service request procedure has been initiated for MO-IMS-registration-related signaling (e.g., a register, subscribe, re-register, registration, reregistration, and subscription refresh message or signaling) (in addition, access category 9 for the signaling, or an operator defined access category (32 as an embodiment)), in case that the UE receives 5GMM cause 22, the UE (in the UE, inside the UE) provides a notification that the request (or service request) has not been accepted due to (network) congestion (from the NAS layer) to the upper layer (e.g., the application layer).

The above contents are summarized as shown in Table 4-2 below.

TABLE 4-2

5.6.1.5 Service request procedure not accepted by the network
If the service request cannot be accepted, the network shall return a SERVICE REJECT message to the UE including an appropriate 5GMM cause value.
The UE shall take the following actions depending on the 5GMM cause value received in the SERVICE REJECT message.
5GMM cause #22 (Congestion).
Case1 )
If the service request procedure was iniated for an MO MMTEL voice call (i.e. access category 4) or for an MO IMS registration related signalling(i.e. access category 9), a notification that the service request was not accepted due to congestion shall be provided to the upper layers.
Case 2)
If the service request procedure was initiated for an MO IMS registration related signalling (i.e. access category 9) (eg. Register, Subscribe, re-Register, registraation, reregistration, subscription refresh) (or operator defined access category (eg. 32)), a notification that the service request was not accepted due to congestion shall be provided to the upper layers.

In addition, in the service request procedure, a non-ideal situation of the UE, for example, in case that T3517 expires, a non-ideal situation occurs.

The UE enters a 5GMM-REGISTERED state.

In case that a service request attempt counter is equal to or greater than 5, the UE starts T3525.

In addition, in case that the service request procedure has been initiated in the following situation, 1) MO-IMS-registration-related signaling (e.g., a register, subscribe, re-register, registration, reregistration, and subscription refresh message or signaling)

the UE provides a notification that a request has been accepted to the upper layer (e.g., the application layer) although T3525 has started.

The above contents are summarized as shown in Table 5-1 below.

TABLE 5-1

Service request procedure
5.6.1.7 Abnormal cases in the UE
The following abnormal cases can be identified:
a) T3517 expired.
The UE shall enter the state 5GMM-REGISTERED.
If the service request attempt counter is greater than or equal to 5, the UE shall start timer T3525. Additionally, if the service request was initiated for an MO-IMS-registration-related-signaling (eg. Register, Subscribe, re-Register, registration, reregistration, subscription refresh) , a notification that the service request was accepted despite the UE having started timer T3525 shall be provided to the upper layers.

In addition, in the service request procedure,
a non-ideal situation of the UE, for example, in case that T3517 expires, a non-ideal situation occurs.
The UE enters a 5GMM-REGISTERED state.
In case that a service request attempt counter is equal to or greater than 5, the UE initiates T3525.
Case 1)
In addition,
in case that a service request procedure has been initiated in the following situation,
1) that is, for MO-IMS-registration-related signaling (e.g., a register, subscribe, re-register, registration, reregistration, and subscription refresh message or signaling) or for an MO MMTEL voice call,
in case that the service request procure has been initiated,
the UE (in the UE) provides a notification that a service request has not been accepted (from the NAS layer) to the upper layer (e.g., the application layer) due to the (UE having) started timer T3525.
Case 2)
In addition,
in case that a service request procedure has been initiated in the following situation,
that is, for MO-IMS-registration-related signaling (e.g., a register, subscribe, re-register, registration, reregistration, and subscription refresh message or signaling),
in case that the service request procure has been initiated,
the UE (in the UE) provides a notification that a service request has not been accepted (from the NAS layer) to the upper layer (e.g., the application layer) due to the (UE having) started timer T3525.

The above contents are summarized as shown in Table 5-2 below.

TABLE 5-2

Service request procedure
5.6.1.7 Abnormal cases in the UE
The following abnormal cases can be identified:
a) T3517 expired,
The UE shall enter the state 5GMM-REGISTERED.
If the service request attempt counter is greater than or equal to 5, the UE shall start timer T3525. Additionally, if the service request was initiated for an MO MMTEL voice call or an MO IMS registration related signalling, a notification that the service request was not accepted due to the UE having started timer T3525 shall be provided to the upper layers.
If the service request attempt counter is greater than or equal to 5, the UE shall start timer T3525.
Additionally, if the service request was initiated for an MO IMS registration related signalling (eg. Register, Subscribe, re-Register, registration, reregistration, subscription refresh), a notification that the service request was not accepted due to the UE having started timer T3525 shall be provided to the upper layers.

In addition, in the service request procedure,
a non-ideal situation of the UE, for example, in case that T3346 is running, the following non-ideal situation occurs.
In case that T3346 is running,
or in case that a service request procedure has been triggered in the following situation,
1) MO-IMS-registration-related signaling (e.g., a register, subscribe, re-register, registration, reregistration, and subscription refresh message or signaling),
the UE provides a notification that a request has been accepted to the upper layer (e.g., the application layer) despite congestion.

The above contents are summarized as shown in Table 6-1 below.

TABLE 6-1

Service request procedure
5.6.1.7 Abnormal cases in the UE
The following abnormal cases can be identified:
c) Timer T3346 is running.
If the service request procedure was triggered for an MO-IMS-registration-related-signaling (eg, Register, Subscribe, re-Register, registration, reregistration, subscription refresh) (i.e. access category 9, or operator defined access category (eg.32)), a notification that the service request procedure was intiated despite congestion shall be provided to the upper layers.

In addition, in the service request procedure,
a non-ideal situation of the UE, for example, in case that T3346 is running, the following non-ideal situation occurs.
In case that T3346 is running,
or in case that a service request procedure has been triggered in the following situation,
Case 1) in case that the service request procedure has been triggered for MO-IMS-registration-related signaling (e.g., a register, subscribe, re-register, registration, reregistration, and subscription refresh message or signaling) or for an MO MMTEL voice call,
the UE (in the UE) provides a notification that the service request procedure has not been initiated due to congestion (from the NAS layer) to the upper layer (e.g., the application layer).
Case 2) in the case of MO-IMS-registration-related signaling (e.g., a register, subscribe, re-register, registration, reregistration, and subscription refresh message or signaling)
the UE (in the UE) provides a notification that the service request procedure has not been initiated due to congestion (from the NAS layer) to the upper layer (e.g., the application layer).

The above contents are summarized as shown in Table 6-2 below.

TABLE 6-2

Service request procedure
5.6.1.7 Abnormal cases in the UE
The following abnormal cases can be identified:
c) Timer T3346 is running.
Case 1)
If the service request procedure was triggered for an MO MMTEL voice call i.e. access category 4) or an MO IMS registration related signalling (i.e access category 9), a notification than the service request procedure was not iniatiated due to congestion shall be provided to the upper layers.
Case 2)
If the service request procedure was triggered for an MO IMS registration related signaling(eg. Register, Subscribe, re-Register, registration, reregistration, subscription refresh) (i.e. access category 9, or operator defined access category (eg.32)), a notification that the service request procedure was not initiated due to congestion shall be provided to the upper layers.

(Method 2)

Figure 3:
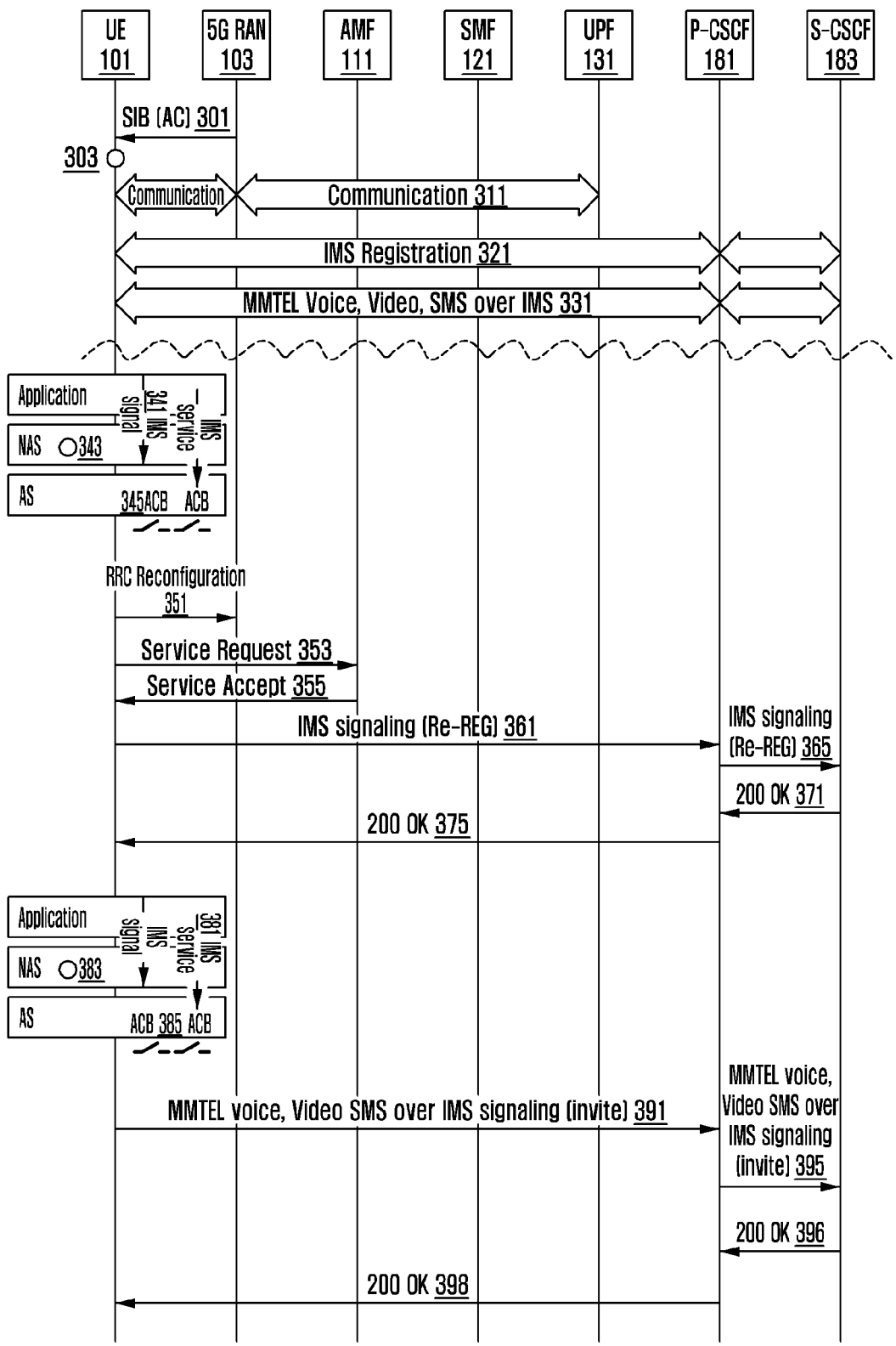
FIG. 3 illustrates an embodiment of a procedure and a method for performing communication by allowing and controlling access of a terminal by using a NAS protocol in a 5G network environment, according to another embodiment of the disclosure.

FIG. 3 illustrates an embodiment of a procedure and a method for performing communication by allowing and controlling access of a terminal by using a NAS protocol in a 5G network environment, according to another embodiment of the disclosure.

In operation 301, a UE may receive information on an access category from a 5G RAN gNB. For example, the UE may receive access category information via broadcasted information by using SIB1.

In operation 303, the UE may store the received access category.

In operation 311, the UE may perform communication with a UPF via a 5G RAN.

In operation 321, the UE may perform, via P-CSCF and S-CSCF, an IMS registration process, for example, a registration process for using an MMTEL voice, video, or SMS over IMS. Such a process is a session registration and session setup process for using an MMTEL voice, video, or SMS over IMS.

In operation 331, the UE may negotiate a session for a service such as an MMTEL voice, video, or SMS over IMS. Via such a session negotiation process, a resource reservation for a service such as an MMTEL voice, video, or SMS over IMS may be made. In addition, the UE may use IMS, MMTEL, SMS over IMS-related services, for example, an MMTEL voice, video, or SMS over IMS. After operation 331, for some reason, a situation in which a session for the IMS of the UE is disconnected and an RRC is also released may occur.

Subsequent operations 341 and 343 to 345 are processes occurring inside the UE.

Referring to operation 341, an IMS signal may be transmitted to a NAS layer from an application layer of the UE, for example, an upper layer in charge of an IMS-related service. Such an IMS signal corresponds to, for example, a signal related to mobile originating IMS registration, subscription, and notification. Specifically, for an IMS-related service, the application layer may trigger initiation of an operation in order to transmit an IMS session register message, a reregister or register message, or a signal (subscribe) message for subscription. Alternatively, in case that a notify message for transmission of information to the UE from an IMS-related network node is received, the initiation of the operation may be triggered to receive the notify message to the NAS layer from the upper layer of the UE, for example, the application layer.

In operation 343 the NAS layer of the UE may map an access attempt type and an access category descended from the upper layer (e.g., the application layer), so as to transmit the same to an AS layer.

Alternatively, the NAS layer of the UE may map an access attempt type and an access category according to a signaling indication descended from the upper layer (e.g., the application layer), so as to transmit, to the AS layer, an access category corresponding to the signaling indication. For example, the upper layer transmits, to the NAS layer, a signal indicating that an MO-IMS-registration-related signal has started, and the NAS layer maps an access attempt type and an access category related to the MO-IMS-registration-related signal. According to an embodiment, the NAS layer may transmit an access category corresponding to the MO-IMS-registration-related signal to the AS layer. In this case, one access category selected by mapping may be transmitted to the AS layer. According to another embodiment, in this case, an access category selected by mapping may be transmitted to multiple AS layers.

In this case, the access attempt type may be an access attempt type corresponding to a mobile originating (MO) IMS-related signal such as an IMS register, IMS reregister, IMS subscribe, or IMS notify message. In addition, an access category mapped with the access attempt type may be an operator defined access category. Therefore, in the case of the operator defined access category, values from 32 to 63 may be used, and thus an access category value configured in a corresponding operator network may be an access category for a mobile originating IMS-related signal, for example, an IMS register, IMS reregister, IMS subscribe, or IMS Notify message, and the like. In the disclosure, an example in which number 32 is used as the operator defined access category will be described.

Thereafter, in operation 345, in case that access category information stored in the UE is, for example, at least one of 3 or 7, the AS layer of the UE may determine whether to block access of the UE to a corresponding cell, based on access attempt type information and information of access category 32 received from an NAS. Specifically, the AS layer may determine whether to block access by using a barring factor included in access class barring (ACB) information which is received.

Alternatively, as an embodiment, based on information which allows barring or access, and an access category-related barring factor stored in the UE, the AS layer of the UE may determine whether to block access of the UE to a corresponding cell, based on the access category information received from the NAS.

For example, in case that the received ACB value is 7, since a value received from the NAS indicates access category 32 in which an access attempt type is mapped to an IMS registration-related value, the AS layer may allow access of the UE to a corresponding cell without blocking an access attempt from the NAS layer.

Alternatively, in case that the received ACB values are 3 and 7, since a value received from the NAS indicates access category 9 in which an access attempt type is mapped to an IMS registration-related value, the AS layer may allow access of the UE to a corresponding cell without blocking an access attempt from the NAS layer.

Therefore, in operation 351, the UE may transmit an RRC reconfiguration request or RRC configuration request message to the gNB (e.g., 5G NR).

As in operation 353, the NAS layer of the UE may deliver a service request message to an AMF.

Thereafter, as in operation 355, in response to the service request message, a service accept message may be transmitted from the AMF to the UE.

Thereafter, in operations 361 and 365, a message such as reregistration, registration, or subscribe, which is IMS signaling, may be transmitted from the UE to the S-CSCF via the P-CSCF.

Thereafter, as in operations 371 and 375, a 200 OK message, which is a response to notify that reregistration, registration, or subscribe has succeeded, may be transmitted from the S-CSCF to the UE via the P-CSCF.

Subsequent operations 381, 383, and 385 are processes occurring inside the UE.

Thereafter, as in operation 381, a signal related to IMS session negotiation for using a service such as an MMTEL voice, MMTEL video, or SMS over IMS inside the UE, that is, an IMS signal for reservation of a resource for an MMTEL voice, MMTEL video, or SMS over IMS service, for example, a signal such as INVITE or PRACK, may be triggered from the upper layer (e.g., the application layer) to the NAS layer.

In operation 383, according to an example, in the NAS layer of the UE, in case that an access attempt type corresponds to an MMTEL voice, 4 may be mapped to an access category, in case that the access attempt type corresponds to an MMTEL video, 5 may be mapped to the access category, and in case that the access attempt type corresponds to an SMS over IMS, 6 may be mapped to the access category.

Thereafter, in operation 385, in case that access category information stored in the UE is, for example, 3, 7, or the like, in the case of the MMTEL voice received from the NAS, the AS layer of the UE may determine whether to block access by using a barring factor included in the received access class barring (ACB) information, based on access attempt type information and information of access category 4. For example, in case that the received ACB value is 3 or 7, since a value received from the NAS indicates access category 4 in which an access attempt type is mapped to an MMTEL voice value, the AS layer may allow access of the UE to a corresponding cell without blocking an access attempt from the NAS layer.

For example, in case that the received ACB value is 4, since a value received from the NAS indicates access category 4 in which an access attempt type is mapped to an MMTEL voice value, the AS layer may block an access attempt from the NAS layer and may not allow access of the UE to a corresponding cell.

Thereafter, as in operations 391 and 395, a message such as INVITE or PRACK for an IMS MMTEL video, MMTEL voice, or IMS over SMS may be transmitted from the UE to the S-CSCF via the P-CSCF.

Thereafter, as in operations 396 and 398, a 200 OK message, which is a response to notify that the INVITE, PRACK, or the like for the IMS MMTEL video, MMTEL voice, or IMS over SMS, has succeeded, may be transmitted from the S-CSCF to the UE via the P-CSCF.

Figure 4:
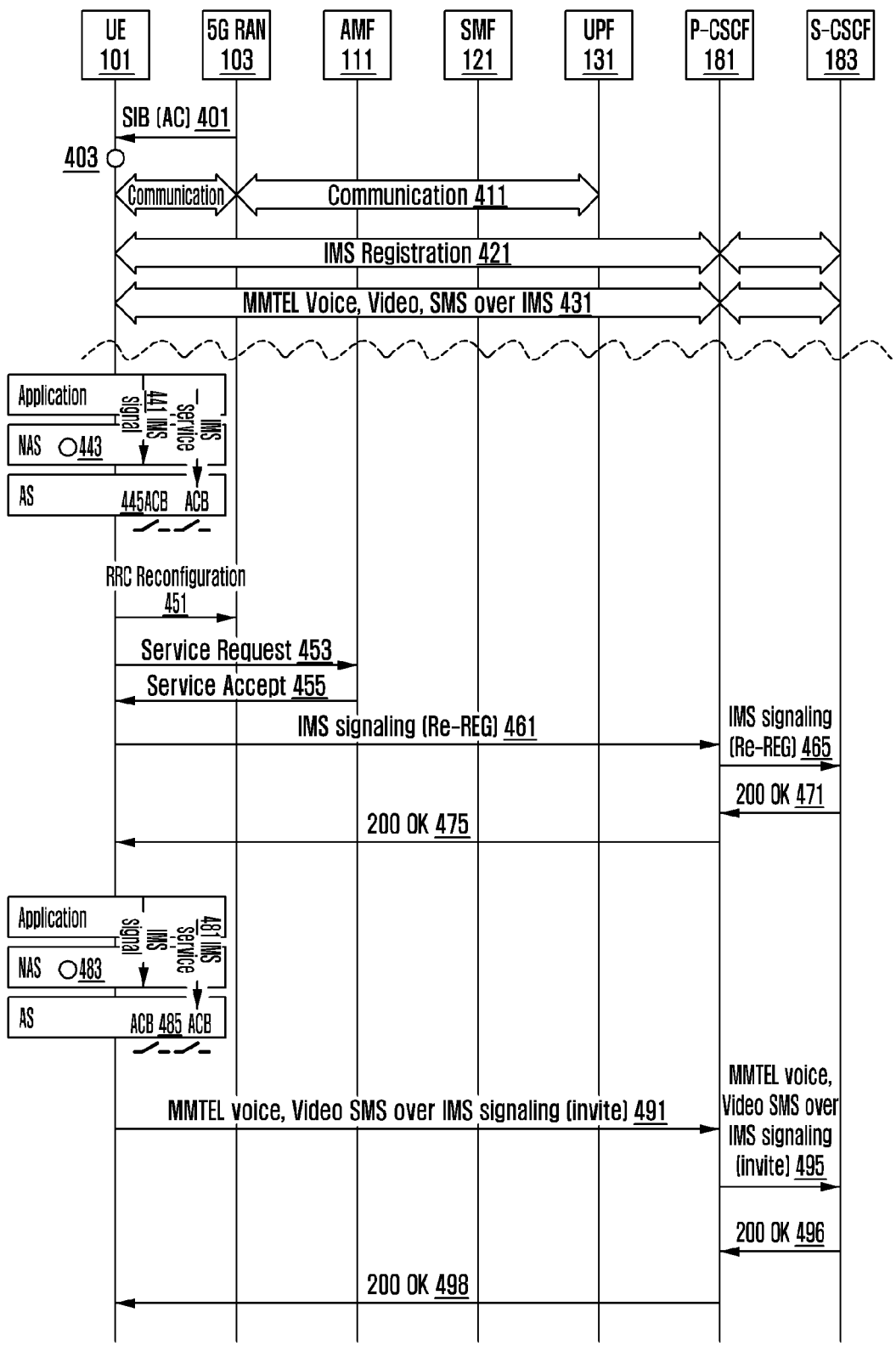
FIG. 4 illustrates an embodiment of a procedure and a method for performing communication by allowing and controlling access of a terminal by using a NAS protocol in a 5G network environment, according to another embodiment of the disclosure.

FIG. 4 illustrates an embodiment of a procedure and a method for performing communication by allowing and controlling access of a terminal by using a NAS protocol in a 5G network environment, according to an embodiment of the disclosure.

In operation 401, a UE may receive information on an access category from a 5G RAN gNB. For example, the UE may receive access category information via broadcasted information, from the gNB, by using SIB1.

In operation 403, the UE may store the received access category.

In operation 411, the UE may perform communication with a UPF via a 5G RAN.

In operation 421, the UE may perform, via P-CSCF and S-CSCF, an IMS registration process, for example, a registration process for using an MMTEL voice, video, or SMS over IMS. Such a process is a session registration and session setup process for using an MMTEL voice, video, or SMS over IMS.

In operation 531, the UE may negotiate a session for a service such as an MMTEL voice, video, or SMS over IMS. Via such a session negotiation process, a resource reservation for a service such as an MMTEL voice, video, or SMS over IMS may be made. In addition, the UE may use a relevant service, for example, an MMTEL voice, video, or SMS over IMS. After operation 531, for some reason, a situation in which a session for the IMS of the UE is disconnected and an RRC is also released may occur.

Subsequent operations 441 and 443 to 445 are processes occurring inside the UE.

Referring to operation 441, an IMS signal may be transmitted to a NAS layer from an application layer of the UE, for example, an upper layer in charge of an IMS-related service. Such an IMS signal corresponds to, for example, a signal related to mobile originating IMS registration, subscription, and notification. Specifically, for an IMS-related service, the application layer may trigger initiation of an operation in order to transmit an IMS session register message, a reregister or register message, or a signal (subscribe) message for subscription. Alternatively, in case that a notify message for transmission of information to the UE from an IMS-related network node is received, the initiation of the operation may be triggered to receive the notify message to the NAS layer from the upper layer of the UE, for example, the application layer.

In operation 443, the NAS layer of the UE may map an access attempt type and an access category descended from the upper layer (e.g., the application layer), so as to transmit the same to an AS layer.

Alternatively, the NAS layer of the UE may map an access attempt type and an access category according to a signaling indication descended from the upper layer (e.g., the application layer), so as to transmit, to the AS layer, an access category corresponding to the signaling indication. For example, the upper layer transmits, to the NAS layer, a signal indicating that an MO-IMS-registration-related signal has started, and the NAS layer maps an access attempt type and an access category related to the MO-IMS-registration-related signal. According to an embodiment, the NAS layer may transmit an access category corresponding to the MO-IMS-registration-related signal to the AS layer. In this case, one access category selected by mapping may be transmitted to the AS layer. According to another embodiment, in this case, an access category selected by mapping may be transmitted to multiple AS layers.

In this case, the access attempt type may be an access attempt type corresponding to a mobile originating (MO) IMS-related signal such as an IMS register, IMS reregister, IMS subscribe, or IMS notify message. In addition, an access category mapped with the access attempt type may use an existing access category. Further, in the case of using such an existing access category, there is separate information (e.g., an indicator, an indication bit, etc.) as an SIB, so that a terminal is required to be able to determine whether corresponding information exists or whether a corresponding bit is set. That is, in the case where such an indicator or indication bit exists, even in case that the existing access category is used, the access category may not be blocked by referring to the corresponding indicator or indication bit.

For example, number 7 may be used in the case of mobile originating data, that is, MO-data, or number 4 may be used in relation to an MMTEL voice, number 5 may be used in relation to an MMTEL video, and number 6 may be used in relation to an SMS over IMS. That is, in the case of mapping IMS-registration-related signaling (e.g., register, subscribe, etc.) to an access category of number 4, 5, or 6, or number 7, the AS layer may be informed whether a signal is related to IMS session setup. That is, such a case indicates that an access category and an access attempt type referred to as mobile originating (MO) IMS-related signal such as an IMS register, IMS reregister, IMS subscribe, and IMS Notify message are mapped and reported to the AS layer. In this case, even in case that the access category corresponds to number 4, 5, 6, or 7, in case that the AS layer receives mapping information from the NAS layer, the corresponding mapping information is separated from access category #4 for an MMTEL voice, access category #5 for an MMTEL video, access category #6 for an SMS over IMS, and general mobile originating data (MO-data), and in case that the AS layer performs a check related to access barring, the corresponding signal may be processed separately from the MMTEL voice, MMTEL video, SMS over IMS, or MO-data.

Thereafter, in operation 445, in case that access category information stored in the UE is, for example, at least one of 3 or 7, the AS layer of the UE may determine whether to block access of the UE to a corresponding cell, based on access attempt type information, information of access category, and mapping information which are received from an NAS. Specifically, the AS layer may determine whether to block access by using a barring factor included in access class barring (ACB) information which is received.

Alternatively, as an embodiment, based on information which allows barring or access, and an access category-related barring factor stored in the UE, the AS layer of the UE may determine whether to block access of the UE to a corresponding cell, based on the access category information received from the NAS.

In this case, the AS layer may allow access by using information such as an indicator which does not block access in the case of IMS-related signaling (an IMS register signal, subscribe, reregister, etc.), that is, an indicator which does not perform access barring, an indicator which can skip access barring, or an indication bit, as well as a barring factor (blocking factor) included in the ACB information.

According to an embodiment, in the case where an access category received via an SIB is 4 and the IMS registration is performed again for an MMTEL voice, in case that the received ACB value is 4, a value received from the NAS indicates a case where an access attempt type corresponds to a value related to IMS registration and an access category mapped thereto is 4, but the AS layer may allow access of the UE to a corresponding cell without blocking an access attempt from the NAS layer.

According to another embodiment, in the case where an access category received via an SIB is 5 and the IMS registration is performed again for an MMTEL video, in case that the received ACB value is 5, a value received from the NAS indicates a case where an access attempt type corresponds to a value related to IMS registration and an access category mapped thereto is 5, but the AS layer may allow access of the UE to a corresponding cell without blocking an access attempt from the NAS layer.

According to still another embodiment, in the case where an access category received via an SIB is 6 and the IMS registration is performed again for an SMS over SMS, in case that the received ACB value is 6, a value received from the NAS indicates a case where an access attempt type corresponds to a value related to IMS registration and an access category mapped thereto is 6, but the AS layer may allow access of the UE to a corresponding cell without blocking an access attempt from the NAS layer.

According to still another embodiment, in the case where an access category received via an SIB is 7 and the IMS registration is performed again for MO data, in case that the received ACB value is 7, a value received from the NAS indicates a case where an access attempt type corresponds to a value related to IMS registration and an access category mapped thereto is 7, but the AS layer may allow access of the UE to a corresponding cell without blocking an access attempt from the NAS layer.

Therefore, in operation 451, the UE may transmit an RRC reconfiguration request (RRC reconfiguration request or RRC configuration request) message to the gNB (e.g., 5G NR).

As in operation 453, the NAS layer of the UE may deliver a service request message to an AMF.

Thereafter, as in operation 455, in response to the service request message, a service accept message may be transmitted from the AMF to the UE.

Thereafter, in operations 461 and 465, a message such as reregistration, registration, or subscribe, which is IMS signaling, may be transmitted from the UE to the S-CSCF via the P-CSCF.

Thereafter, as in operations 471 and 475, a 200 OK message, which is a response to notify that reregistration, registration, or subscribe has succeeded, may be transmitted from the S-CSCF to the UE via the P-CSCF.

Subsequent operations 481 and 483 to 485 are processes occurring inside the UE.

Thereafter, as in operation 481, a signal related to IMS session negotiation for using a service such as an MMTEL voice, MMTEL video, or SMS over IMS inside the UE, that is, an IMS signal for reservation of a resource for an MMTEL voice, MMTEL video, or SMS over IMS service, for example, a signal such as INVITE or PRACK, may be triggered from the upper layer (e.g., the application layer) to the NAS layer.

In operation 583, according to an example, in the NAS layer of the UE, in case that an access attempt type corresponds to an MMTEL voice, 4 may be mapped to an access category, in case that the access attempt type corresponds to an MMTEL video, 5 may be mapped to the access category, and in case that the access attempt type corresponds to an SMS over IMS, 6 may be mapped to the access category.

Thereafter, in operation 585, in case that access category information stored in the UE is, for example, at least one of 3 or 7, in the case of the MMTEL voice received from the NAS, the AS layer of the UE may determine whether to block access by using a barring factor included in the received access class barring (ACB) information, based on access attempt type information and information of access category 4. For example, in case that the received ACB value is 3 or 7, since a value received from the NAS indicates access category 4 in which an access attempt type is mapped to an MMTEL voice value, the AS layer may allow access of the UE to a corresponding cell without blocking an access attempt from the NAS layer.

For example, in case that the received ACB value is 4, since a value received from the NAS indicates access category 4 in which an access attempt type is mapped to an MMTEL voice value, the AS layer may block an access attempt from the NAS layer and may not allow access of the UE to a corresponding cell.

Thereafter, as in operations 491 and 495, a message such as INVITE or PRACK for an IMS MMTEL video, MMTEL voice, or IMS over SMS may be transmitted from the UE to the S-CSCF via the P-CSCF.

Thereafter, as in operations 496 and 498, a 200 OK message, which is a response to notify that the INVITE, PRACK, or the like for the IMS MMTEL video, MMTEL voice, or IMS over SMS, has succeeded, may be transmitted from the S-CSCF to the UE via the P-CSCF.

Figure 5:
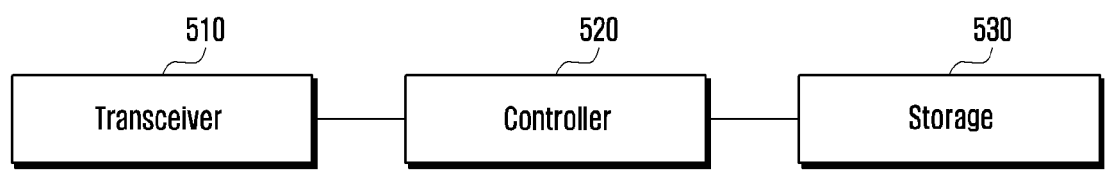
FIG. 5 illustrates a structure of a terminal, according to an embodiment of the disclosure.

FIG. 5 is a block diagram illustrating a structure of a terminal, according to an embodiment of the disclosure.

Referring to FIG. 5, a terminal may include a transceiver 510, a controller 520, and a storage 530. In the disclosure, the controller 520 may be defined as a circuit or an application-specific integrated circuit, or at least one processor.

The transceiver 510 may transmit or receive a signal to or from other network entities. For example, the transceiver 510 may receive system information from a base station, and may receive a synchronization signal or a reference signal. Specifically, the transceiver 510 may receive SIB 1 including information on an access category. In addition, the transceiver 510 may receive a message from an AMF.

The controller 520 may control the overall operation of the terminal according to the embodiments proposed in the disclosure. For example, the controller 520 may control a signal flow between blocks so as to perform the operation according to the above-described flowchart. Specifically, according to an embodiment of the disclosure, the controller 520 may control an operation proposed in the disclosure to control access barring for an IMS-related signal and an IMS service-related signal.

Specifically, the controller 520 may control to cause an application layer to generate a mobile originating (MO) Internet protocol (IP) multimedia subsystem (IMS) registration-related IMS signal generated in the terminal, control to cause a non-access stratum (NAS) layer to map access category information to an access attempt type of the MO-IMS-registration-related IMS signal, and control the transceiver 510 to transmit the access category information mapped to the access attempt type from the NAS layer to an AS layer.

In case that the access category information mapped to the access attempt type is 9, in the AS layer, the controller 520 may determine to allow access for the access attempt type.

The storage 530 may store at least one of information transmitted or received via the transceiver 510 and information generated via the controller 520. For example, the storage 530 may map and store an access category and an access attempt type such as a generated mobile originating access attempt type.

The methods according to various embodiments described in the claims or the specification of the disclosure may be implemented by hardware, software, or a combination of hardware and software.

In case that the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method of a terminal in a wireless communication system, the method comprising:
generating by an application layer of the terminal, a mobile originating (MO) Internet protocol (IP) multimedia subsystem (IMS) registration-related IMS signal (MO-IMS-registration-related IMS signal), generated in the terminal;
mapping, by a non-access stratum (NAS) layer of the terminal, access category information corresponding to the MO-IMS-registration-related IMS signal among a plurality of access attempt types;
transmitting the mapped access category information, by the NAS layer of the terminal to an AS layer of the terminal;
determining by the AS layer of the terminal, to allow access in case that the mapped access category information is 9 indicating an access attempt type for the MO-IMS-registration-related IMS signal;
receiving a reject message including a 5GS mobility management (5GMM) cause value, in case that a registration procedure for a mobility and periodic registration update is initiated and the mobility and periodic registration update is not allowed by a network;
identifying that the 5GMM cause value included in the reject message is 22, the 22 indicating that the mobility and periodic registration update is not accepted by the network due to a network congestion; and
in case that the registration procedure for the mobility and periodic registration update, upon request for the MO-IMS-registration-related IMS signal generated from the application layer of the terminal, is initiated and the registration procedure is not allowed by the network, delivering, by the NAS layer of the terminal to the application layer of the terminal, a notification indicating that the registration procedure has not been initiated due to network congestion based on the identified 5GMM cause value.

2. The method of claim 1, further comprising:
identifying by the NAS layer of the terminal, that the terminal is in a 5GMM registration (5GMM-registered) state;
identifying whether the terminal accesses a 3GPP or a non-3GPP;
identifying whether a first timer is running; and
initiating the registration procedure for the mobility and periodic registration update upon request for the MO-IMS-registration-related IMS signal from the application layer of the terminal, in case that the terminal is in a 3GPP access state or a non-3GPP access state and the first timer is not running.

3. The method of claim 1, further comprising:
transmitting a message for the mobility and periodic registration update to the network.

4. The method of claim 1, further comprising:
identifying that the terminal is in an abnormal case and a first timer is running; and
in case that the registration procedure for the mobility and periodic registration update is for the request for the MO-IMS-registration-related IMS signal mapped to the access category information 9, delivering, by the NAS layer, a notification indicating that the procedure has not been initiated due to network congestion to the application layer.

5. The method of claim 1, further comprising:
transmitting a message for a service request to a network;
receiving a service reject message comprising a 5GMM cause value, in case that the service request is not allowed by the network;
identifying that the 5GMM cause value included in the service reject message is 22; and
in case that a procedure for the service request is for a request for the MO-IMS-registration-related IMS signal mapped to the access category information 9, delivering, by the NAS layer, a notification indicating that the service request has not been initiated due to network congestion to the application layer.

6. The method of claim 5, further comprising:
identifying whether the terminal is in an abnormal case and a second timer expires;
in case that the second timer expires, and in case that the procedure for the service request is for the request for the MO-IMS-registration-related IMS signal, delivering, by the NAS layer, a notification indicating that the service request has not been initiated by the terminal having a third timer to the application layer;
identifying whether the terminal is in the abnormal case and a first timer is running; and
in case that the first timer is running, and in case that the procedure for the service request is for the request for the MO-IMS-registration-related IMS signal mapped to the access category information 9, delivering, by the NAS layer, a notification indicating that the procedure has not been initiated due to network congestion to the application layer.

7. A terminal in a wireless communication system, the terminal comprising:
a transceiver; and
a controller configured to:
control an application layer of the terminal to generate a mobile originating (MO) Internet protocol (IP) multimedia subsystem (IMS) registration-related IMS signal (MO-IMS-registration-related IMS signal), generated in the terminal;
control a non-access stratum (NAS) layer of the terminal to map access category information to an access attempt type of the MO-IMS-registration-related IMS signal;
control the transceiver to transmit the access category information mapped to the access attempt type from the NAS layer of the terminal to an AS layer of the terminal;
control the AS layer of the terminal to determine to allow access for the access attempt type in case that the access category information mapped to the access attempt type is 9;
control the transceiver to receive a reject message including a 5GS mobility management (5GMM) cause value, in case that a registration procedure for a mobility and periodic registration update is initiated and the mobility and periodic registration update is not allowed by a network;
identify that the 5GMM cause value included in the reject message is 22; and
in case that the registration procedure for the mobility and periodic registration update is for a request for the MO-IMS-registration-related IMS signal mapped to the access category information 9, control the NAS layer of the terminal to deliver to the application layer of the terminal, a notification indicating that the registration procedure has not been initiated due to network congestion.

8. The terminal of claim 7, wherein the controller is configured to:
control the NAS layer of the terminal to identify that the terminal is in a 5GMM registration (5GMM-registered) state;
identify whether the terminal accesses a 3GPP or a non-3GPP;
identify whether a first timer is running; and
initiate the registration procedure for the mobility and periodic registration update upon request for the MO-IMS-registration-related IMS signal from the application layer of the terminal, in case that the terminal is in a 3GPP access state or a non-3GPP access state and the first timer is not running.

9. The terminal of claim 7, wherein the controller is configured to:
control the transceiver to transmit a message for the mobility and periodic registration update to the network.

10. The terminal of claim 7, wherein the controller is configured to:
identify that the terminal is in an abnormal case and that a first timer is running; and
in case that the registration procedure for the mobility and periodic registration update is for the request for the MO-IMS-registration-related IMS signal mapped to the access category information 9, control to cause the NAS layer to deliver a notification indicating that the procedure has not been initiated due to network congestion to the application layer.

11. The terminal of claim 7, wherein the terminal is configured to:
control the transceiver to transmit a message for a service request to a network; and
control the transceiver to receive a service reject message comprising a 5GMM cause value, in case that the service request is not allowed by the network.

12. The terminal of claim 11, wherein the controller is configured to:
identify that the 5GMM cause value included in the service reject message is 22; and
in case that a procedure for the service request is for a request for the MO-IMS-registration-related IMS signal mapped to the access category information 9, control to cause the NAS layer to deliver a notification indicating that the service request has not been initiated due to network congestion to the application layer.

13. The terminal of claim 11, wherein the controller is configured to:
- identify that the terminal is in an abnormal case and a second timer expires;
- in case that the second timer expires, and in case that a procedure for the service request is for a request for the MO-IMS-registration-related IMS signal, control to cause the NAS layer to deliver a notification indicating that the service request has not been initiated by the terminal having a third timer to the application layer;
- identify that the terminal is in the abnormal case and that a first timer is running; and
- in case that the first timer is running, and in case that the procedure for the service request is for the request for the MO-IMS-registration-related IMS signal mapped to the access category information 9, control to cause the NAS layer to deliver a notification indicating that the procedure has not been initiated due to network congestion to the application layer.

\* \* \* \* \*